(12) United States Patent
Antaya et al.

(10) Patent No.: US 11,383,330 B2
(45) Date of Patent: Jul. 12, 2022

(54) LEAD-FREE SOLDER COMPOSITION

(71) Applicant: Aptiv Technologies Limited, St. Michael (BB)

(72) Inventors: Stephen C. Antaya, West Kingston, RI (US); William Falk, Warwick, RI (US); Justin Amalfitano, East Providence, RI (US); Amit Datta, East Greenwich, RI (US)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 17/027,036

(22) Filed: Sep. 21, 2020

(65) Prior Publication Data

US 2022/0088720 A1 Mar. 24, 2022

(51) Int. Cl.
    B23K 35/26 (2006.01)
    C22C 30/06 (2006.01)
    C22C 30/04 (2006.01)
    C22C 13/00 (2006.01)

(52) U.S. Cl.
    CPC ............ B23K 35/262 (2013.01); C22C 13/00 (2013.01); C22C 30/04 (2013.01); C22C 30/06 (2013.01)

(58) Field of Classification Search
    None
    See application file for complete search history.

(56) References Cited

U.S. PATENT DOCUMENTS

| | | |
|---|---|---|
| 6,680,128 B2 | 1/2004 | Mei |
| 6,767,411 B2 | 7/2004 | Yeh et al. |
| 7,617,964 B2 | 11/2009 | Winter et al. |
| 9,931,716 B2 | 4/2018 | Ikeda et al. |
| 9,975,207 B2 | 5/2018 | Hwang et al. |
| 9,981,347 B2 | 5/2018 | Pereira et al. |
| 10,105,794 B2 | 10/2018 | Hwang et al. |
| 2005/0007234 A1 | 1/2005 | Wada et al. |
| 2006/0067852 A1 | 3/2006 | Suh et al. |
| 2006/0261131 A1* | 11/2006 | Hirata .................. B23K 35/262 228/101 |

(Continued)

FOREIGN PATENT DOCUMENTS

| | | |
|---|---|---|
| CN | 1154403 A | 7/1997 |
| CN | 104690442 A | 6/2015 |

(Continued)

OTHER PUBLICATIONS

Extended European Search Report for EP Application No. 21174741.5 dated Nov. 2, 2021, 11 pages.

*Primary Examiner* — Xiaobei Wang
(74) *Attorney, Agent, or Firm* — Billion & Armitage

(57) ABSTRACT

An electrical connector includes a first layer having a first coefficient of thermal expansion and a second layer overlaying the first layer having a second coefficient of thermal expansion. A first difference between the first coefficient of thermal expansion and a coefficient of thermal expansion of glass is greater than a second difference between the second coefficient of thermal expansion and the coefficient of thermal expansion of glass. The electrical connector further includes a layer of a solder alloy having about 15% to 28% indium by weight, about 5% to 20% zinc by weight, about 1% to 6% silver by weight, and at least 36% tin by weight. The solder layer is disposed on at least a portion of the second layer.

22 Claims, 9 Drawing Sheets

(56) References Cited

U.S. PATENT DOCUMENTS

| | | | | |
|---|---|---|---|---|
| 2008/0318793 A1* | 12/2008 | Somerkoski | ........ | H01L 39/2403 |
| | | | | 324/318 |
| 2012/0318566 A1 | 12/2012 | Reul et al. | | |
| 2014/0158424 A1* | 6/2014 | Schlarb | .................... | B23K 1/19 |
| | | | | 174/94 R |
| 2017/0368642 A1 | 12/2017 | Pereira et al. | | |

FOREIGN PATENT DOCUMENTS

| | | | | |
|---|---|---|---|---|
| CN | 109648222 A | | 4/2019 | |
| CN | 109702372 A | | 5/2019 | |
| EP | 1614500 A1 | | 1/2006 | |
| EP | 1922175 B1 | | 9/2019 | |
| JP | 200-141078 | * | 5/2000 | |
| JP | 2004307958 A | * | 11/2004 | |
| JP | 2011-031253 | * | 2/2011 | |
| WO | WO-9709455 A1 | * | 3/1997 | ............. C22C 13/00 |

\* cited by examiner

LEAD-FREE SOLDER COMPOSITION

TECHNICAL FIELD OF THE INVENTION

The present invention relates generally to lead-free solder compositions and more particularly to lead-free solder compositions suitable for electrical terminals attached to an electrical contact pad, for example on a glass surface.

BACKGROUND OF THE INVENTION

Lead-based solder has been used for soldering electrical terminals to silver grids printed on automotive glass since the heated grid was developed. Indium-based solders were used under special circumstances on annealed glass windshields where the product was particularly sensitive to cracking. Physical properties of high indium-based solders provided better resistance to cracking than leaded solder but was cost prohibitive in regular production.

In the year 2000, the European Union issued a directive to prohibit the use of lead in automotive glass applications after 2003. Although lead would be exempted from this directive for many years, some OEMs and glass suppliers were proactive in the validation and use of lead-free solder. Indium-based lead-free solders developed by Antaya Technologies Corporation have been widely used by glass suppliers globally for both tempered and annealed automotive glass.

The higher cost of indium versus other solder alloy metals has been a barrier to wider application of indium-based lead-free solder. As an alternative, some glass suppliers have developed a process to use high tin (98% tin, 2% silver) solder in combination with an electrical terminal having a stainless-steel base material for tempered glass applications. This high tin solder has the advantage of being inexpensive and the stainless steel provides the benefit of a coefficient of thermal expansion that is close to that of tempered glass. However, this alternative still has drawbacks of causing some glass cracking, a narrow processing temperature window, additional process steps of preheating, controlled cooling of the glass, and a need for silver plating to improve electrical conductivity.

Therefore, the need for electrical terminal capable of being soldered on tempered automotive glass using a lower cost solder than lead-free solder having a high (>50%) indium content and avoids the drawbacks of the high-tin solder/stainless steel solution described above remains desired.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one embodiment, a solder alloy is provided. The solder alloy includes 15% to 28% indium by weight, 5% to 20% zinc by weight, 1% to 6% silver by weight, and 54% to 79% tin by weight.

In an example embodiment having one or more features of the solder alloy of one or more of the previous paragraphs, the solder alloy may comprise at least 41% tin by weight.

In an example embodiment having one or more features of the solder alloy of one or more of the previous paragraphs, the solder alloy may comprise at least 45% tin by weight.

In an example embodiment having one or more features of the solder alloy of one or more of the previous paragraphs, the solder alloy may comprise at least 55% tin by weight.

In an example embodiment having one or more features of the solder alloy of one or more of the previous paragraphs, the solder alloy may comprise at least 60% tin by weight.

In an example embodiment having one or more features of the solder alloy of one or more of the previous paragraphs, the solder alloy may comprise at least 64% tin by weight.

In an example embodiment having one or more features of the solder alloy of one or more of the previous paragraphs, a remaining weight of the solder alloy that is not indium, zinc, or silver may be tin.

In an example embodiment having one or more features of the solder alloy of one or more of the previous paragraphs, the solder alloy may comprise about 17% to 20% indium by weight.

In an example embodiment having one or more features of the solder alloy of one or more of the previous paragraphs, the solder alloy may comprise about 17% indium by weight.

In an example embodiment having one or more features of the solder alloy of one or more of the previous paragraphs, the solder alloy may comprise about 18% indium by weight.

In an example embodiment having one or more features of the solder alloy of one or more of the previous paragraphs, the solder alloy may comprise about 22% indium by weight.

In an example embodiment having one or more features of the solder alloy of one or more of the previous paragraphs, the solder alloy may comprise about 24% indium by weight.

In an example embodiment having one or more features of the solder alloy of one or more of the previous paragraphs, the solder alloy may comprise about 24% indium by weight.

In an example embodiment having one or more features of the solder alloy of one or more of the previous paragraphs, the solder alloy may comprise about 5% zinc by weight.

In an example embodiment having one or more features of the solder alloy of one or more of the previous paragraphs, the solder alloy may comprise about 9% zinc by weight.

In an example embodiment having one or more features of the solder alloy of one or more of the previous paragraphs, the solder alloy may comprise about 12% zinc by weight.

In an example embodiment having one or more features of the solder alloy of one or more of the previous paragraphs, the solder alloy may comprise about 3% silver by weight.

In an example embodiment having one or more features of the solder alloy of one or more of the previous paragraphs, the solder alloy may comprise about 5% silver by weight.

In an example embodiment having one or more features of the solder alloy of one or more of the previous paragraphs, the solder alloy may comprise about 1% to 3% copper by weight.

According to one embodiment, a solder alloy is provided. The solder alloy consists essentially of 15% to 28% indium by weight, 5% to 20% zinc by weight, 1% to 6% silver by weight, and 54% to 79% tin by weight.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
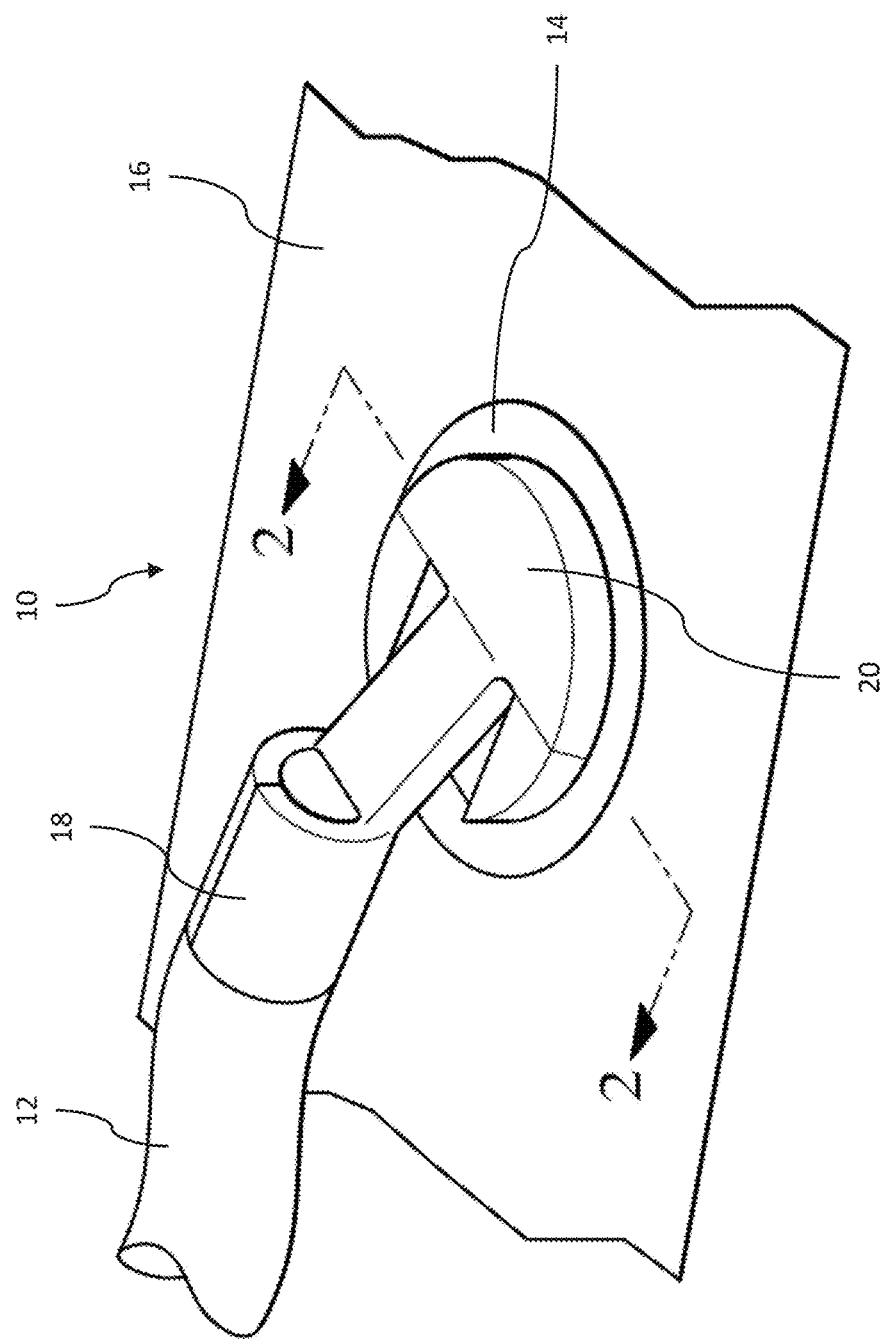
FIG. 1 illustrates an example of an electrically conductive connector designed according to some embodiments.
Figure 2:
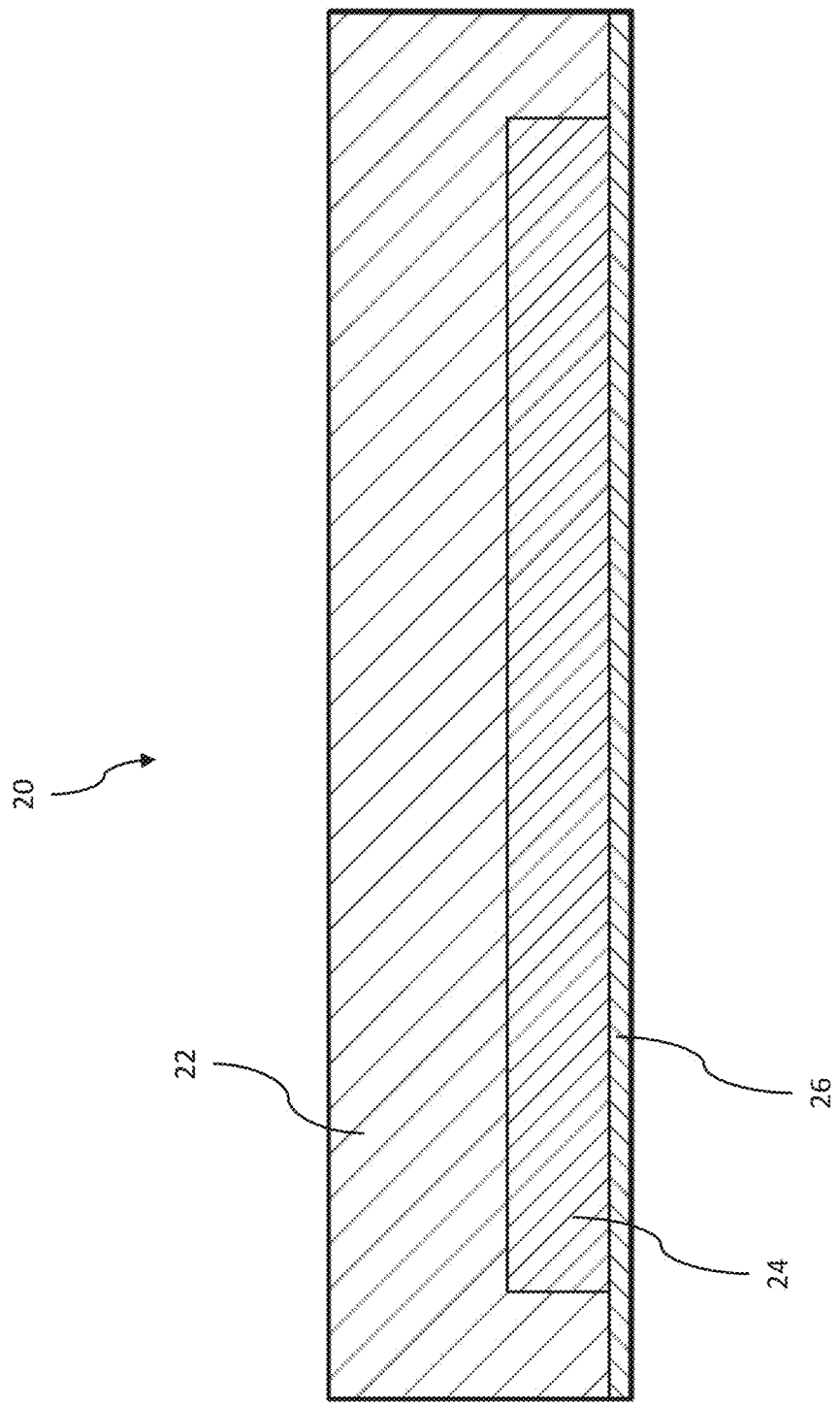
FIG. 2 is a cross section diagram schematically illustrating an arrangement of layers in the electrical connector taken along the lines 2-2 in FIG. 1 according to some embodiments.
Figure 3:
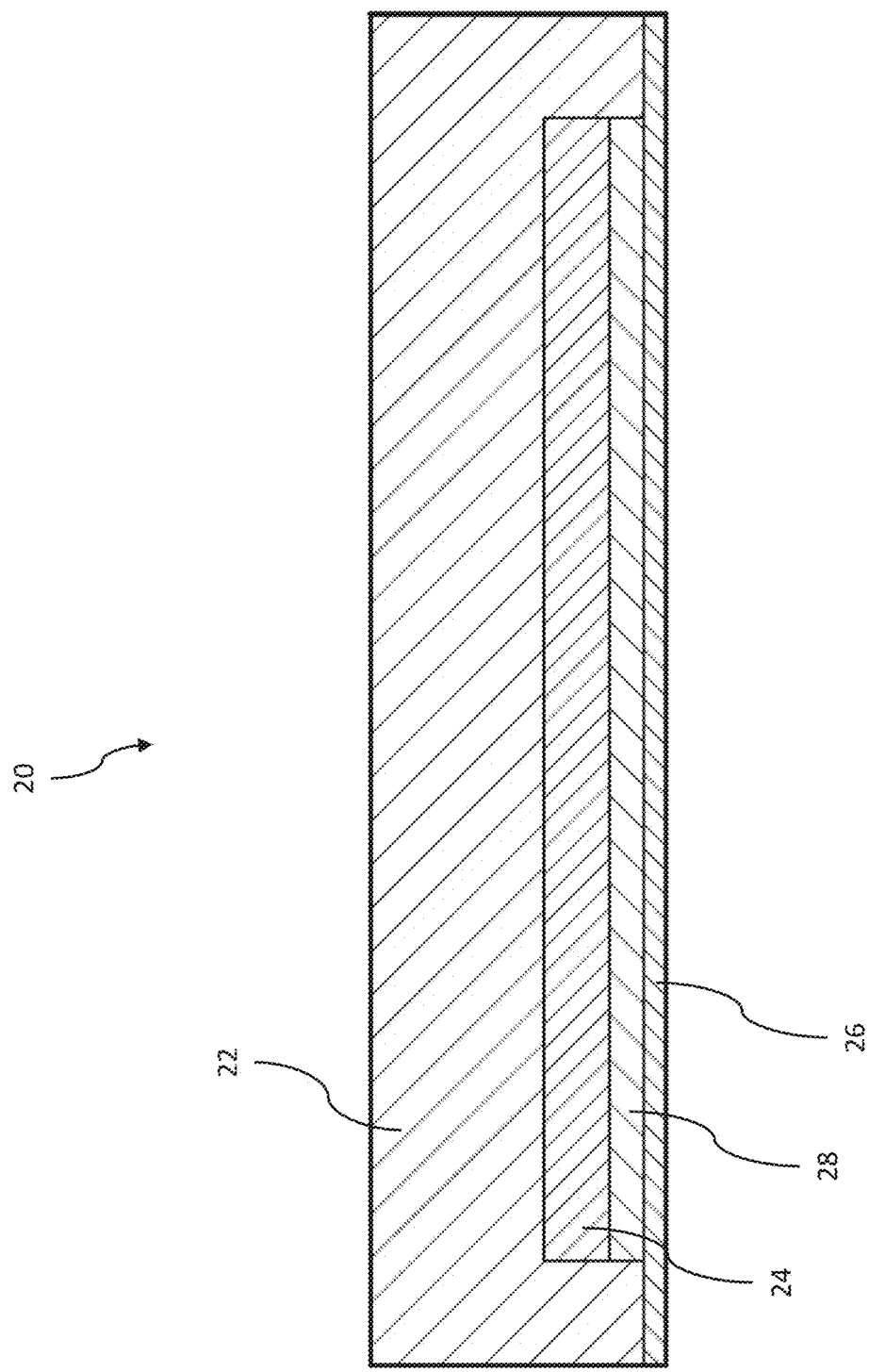
FIG. 3 is a cross section diagram schematically illustrating an arrangement of layers of another example electrically conductive connector designed according to some embodiments.

FIG. 1 illustrates an example of an electrical connector 10 that is adapted to make an electrical connection between a wire electrical cable 12 and a conductive contact pad 14 on a planar surface 16, such as a glass windshield or rear window of an automobile. This connector may be used to establish electrical connections from the vehicle's wiring system to circuits, such as heaters or antennae on the glass surface. The conductive contact pad 14 is typically silver-based. As shown in FIG. 1, the connector 10 has a wire attachment portion 18 that is crimped to the wire cable 12 and a planar contact portion 20. As shown in FIGS. 2 and 3, the contact portion 20 has at least two layers 22, 24 of electrically conductive material. The first layer 22, formed from, for example, a copper-based alloy has a coefficient of thermal expansion (CTE) that is greater than the CTE of the second layer 24, formed from, for example, an iron-nickel alloy. Two examples of suitable iron-nickel alloys are INVAR (typical composition 64% Fe, 36% Ni) or KOVAR (typical composition 54% Fe, 29% Ni, 17% Co). The difference between the coefficient of thermal expansion of the material forming the first layer 22 and the coefficient of thermal expansion of glass is greater than the difference between the coefficient of thermal expansion of the material forming the second layer 24 and the coefficient of thermal expansion of glass.

As shown in FIG. 2, a layer of a solder alloy 26 overlays at least a portion of the second layer 24 of the contact portion 20. The solder layer 26 is in direct and intimate contact with the second layer 24. As shown in FIG. 3, the contact portion 20 also includes a third layer 28 of material overlaying the second layer 24 and the solder layer may be in direct or intimate contact with a portion of the third layer 28 while still overlaying the second layer 24. This third layer 28 may be formed of a copper or tin based alloy and may improve the wetting of the solder to the contact portion 20. The third layer 28 may be clad with or plated on the second layer.

To prevent glass cracking caused by a difference in CTE between the contact portion 20 and the glass surface 16, a lower liquidus temperature is preferred. However, to meet the environmental requirements, a higher solidus temperature is needed to prevent failure of the solder joint between the contact portion 20 and the contact pad 14.

Figure 4:
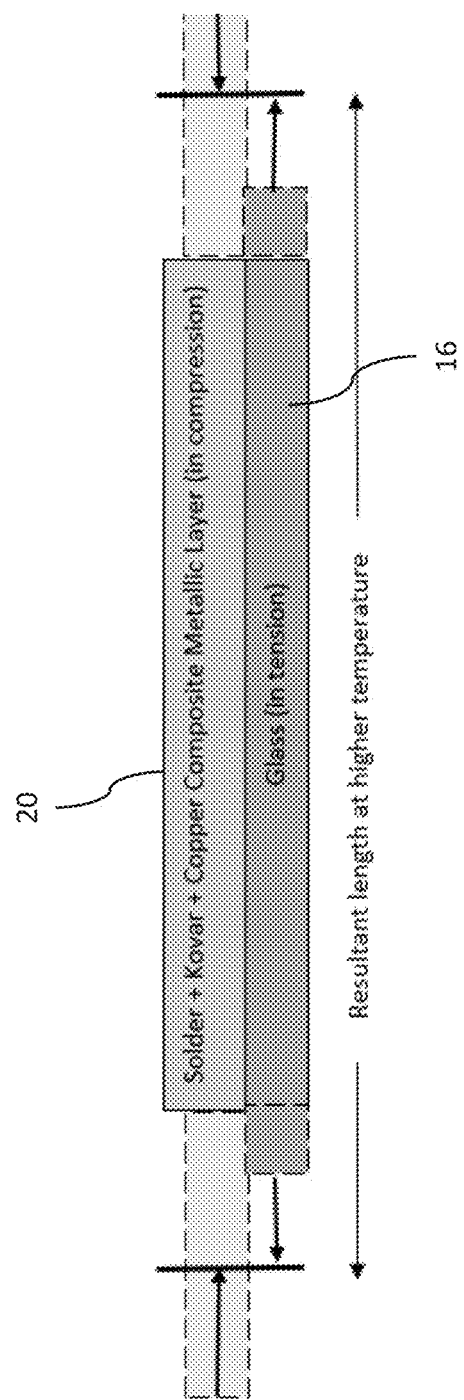
FIG. 4 is a schematic diagram of an electrical connector soldered to a silver coated glass surface illustrating stresses in the glass surface after soldering according to some embodiments.

FIG. 4 illustrates the nature of solder joints between the contact portion 20 and the glass surface 16 when CTE of glass is less than the CTE of the contact portion 20. Because of its lower CTE, the glass surface 16 should be stretched to the resultant length at high temperature and contact portion 20 should be compressed. Therefore, the glass surface 16 will be in tension and the contact portion 20 will in compression. This will be an important consideration because the typical tensile strength for annealed glass is about 6,000 psi and the typical tensile strength for tempered glass 17,000 psi, whereas the compressive strength of both types of glass is about 150,000 psi.

Figure 5:
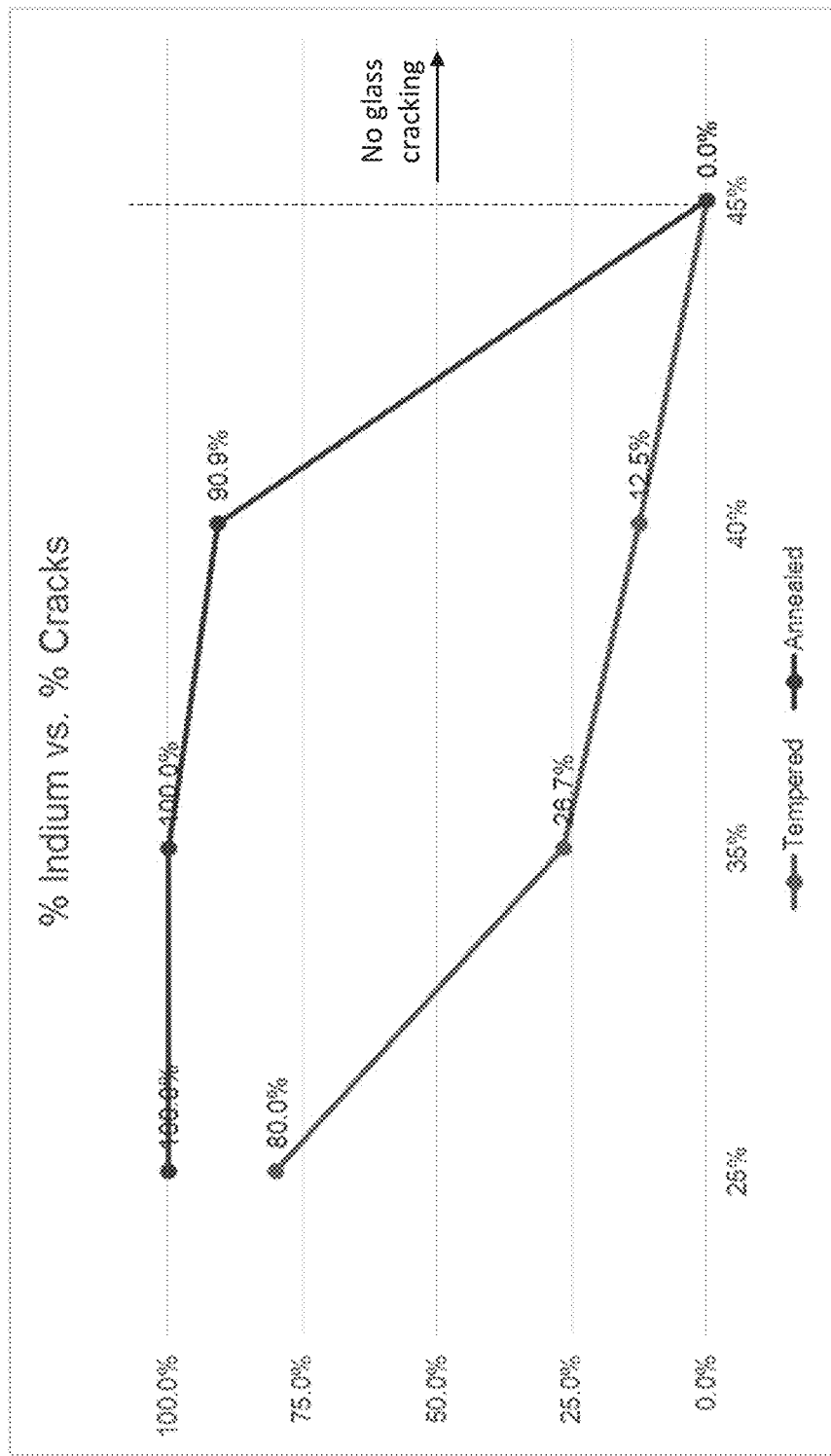
FIG. 5 is a graph of a percentage of glass samples with cracking vs. a percentage of indium in a solder alloy used to attach an electrical connector to the glass samples according to some embodiments.
Figure 6:
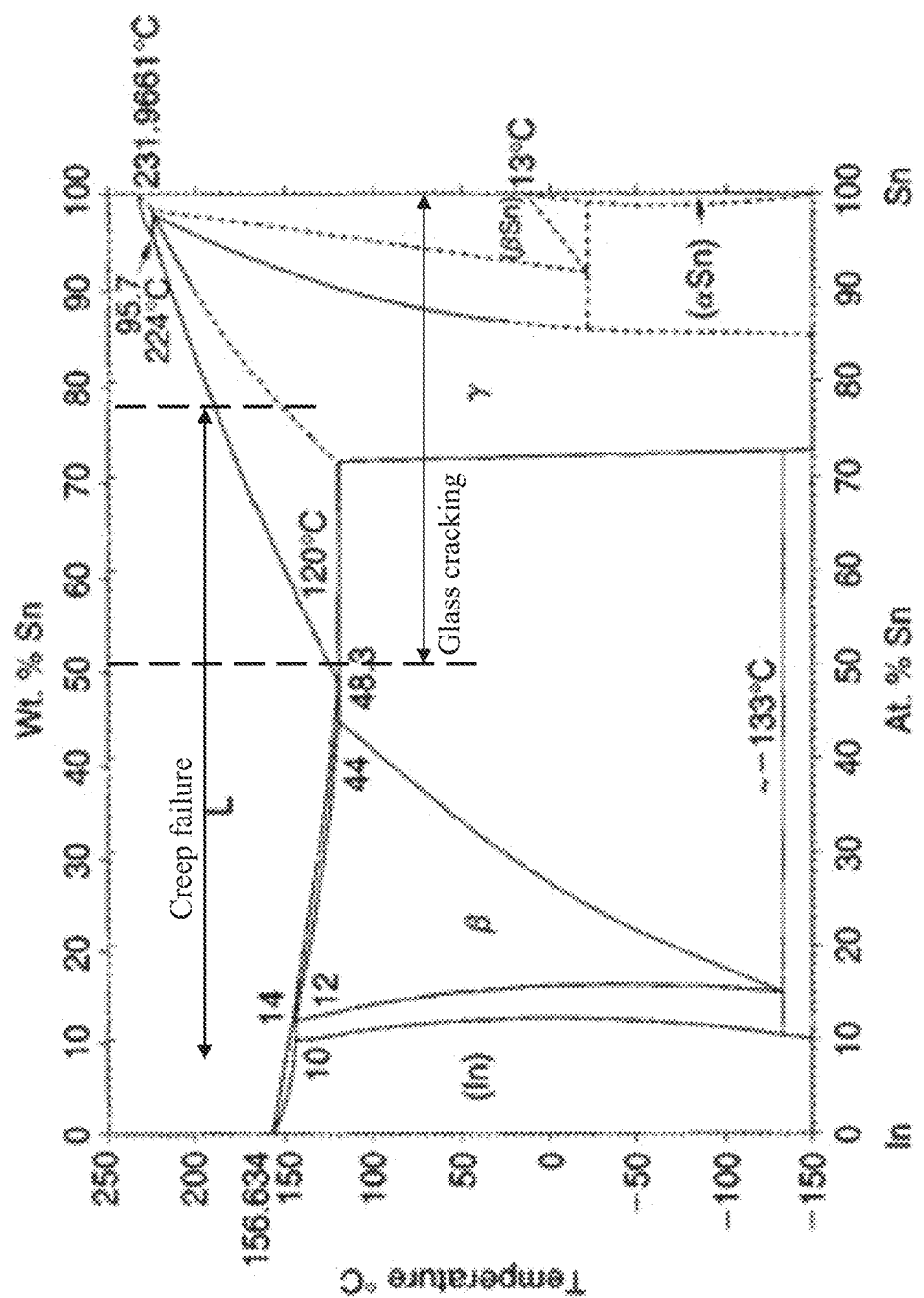
FIG. 6 an indium-tin phase diagram according to some embodiments.

Based on the graph of FIG. 5, it is evident that the percentage of cracked solder joints increased rapidly when the indium concentration of a tin-indium solder alloy is less than 45%. However, an indium content greater than 28% decrease the solidus temperature to 120° C., as evident in the indium-tin phase diagram of FIG. 6 and will lower the solder joint creep strength.

For automotive use, the electrical connector 10 must pass a test exposing the solder joint to a temperature of 140° C. with a 0.5 kg load applied, the solidus temperature should be greater than 155° C., assuming creep strength decreases rapidly at temperatures above 90% of the solidus temperature. A lower indium content (i.e. less than 42%) increases glass cracking propensity but increases creep strength even at indium concentration less than 28% as shown by the dotted lines in the indium-tin phase diagram of FIG. 7.

The layer of solder alloy 26 applied to the contact portion has a composition of about 15% to 28% indium by weight, about 5% to 20% zinc by weight, about 1% to 6% silver by weight, and about 36% to 790% tin by weight. As used herein, "about means±1% for concentrations less than or equal to 20% and ±3% for concentrations greater than 20%.

Figure 7:
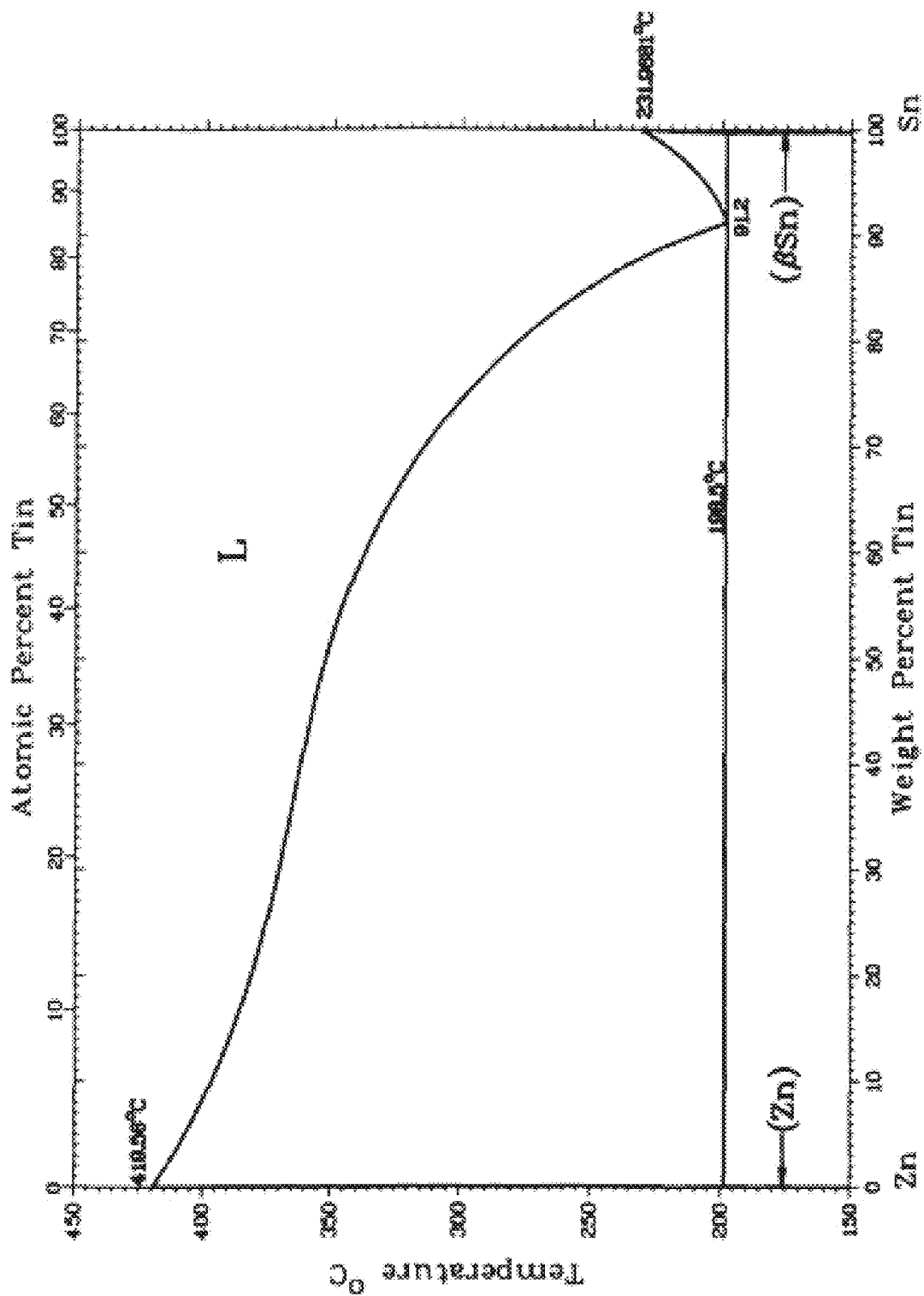
FIG. 7 is a binary phase diagram of zinc and tin according to some embodiments.
Figure 8:
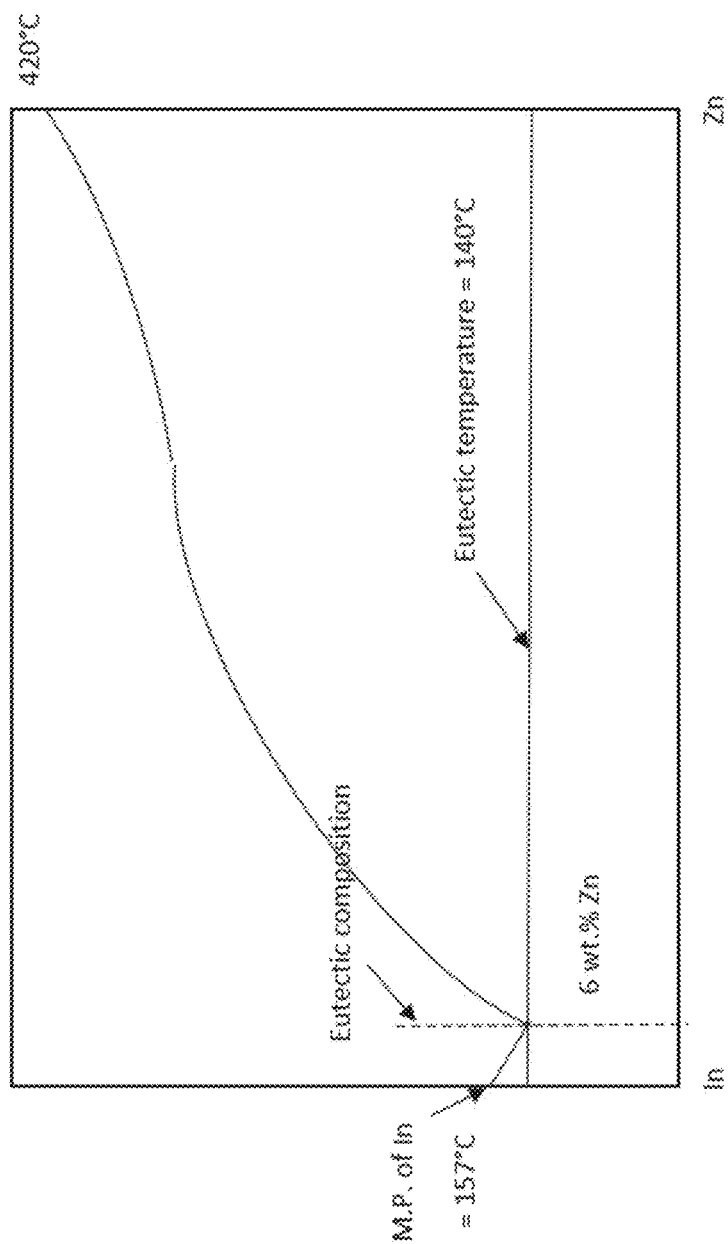
FIG. 8 is a binary phase diagram of indium and zinc according to some embodiments.
Figure 9:
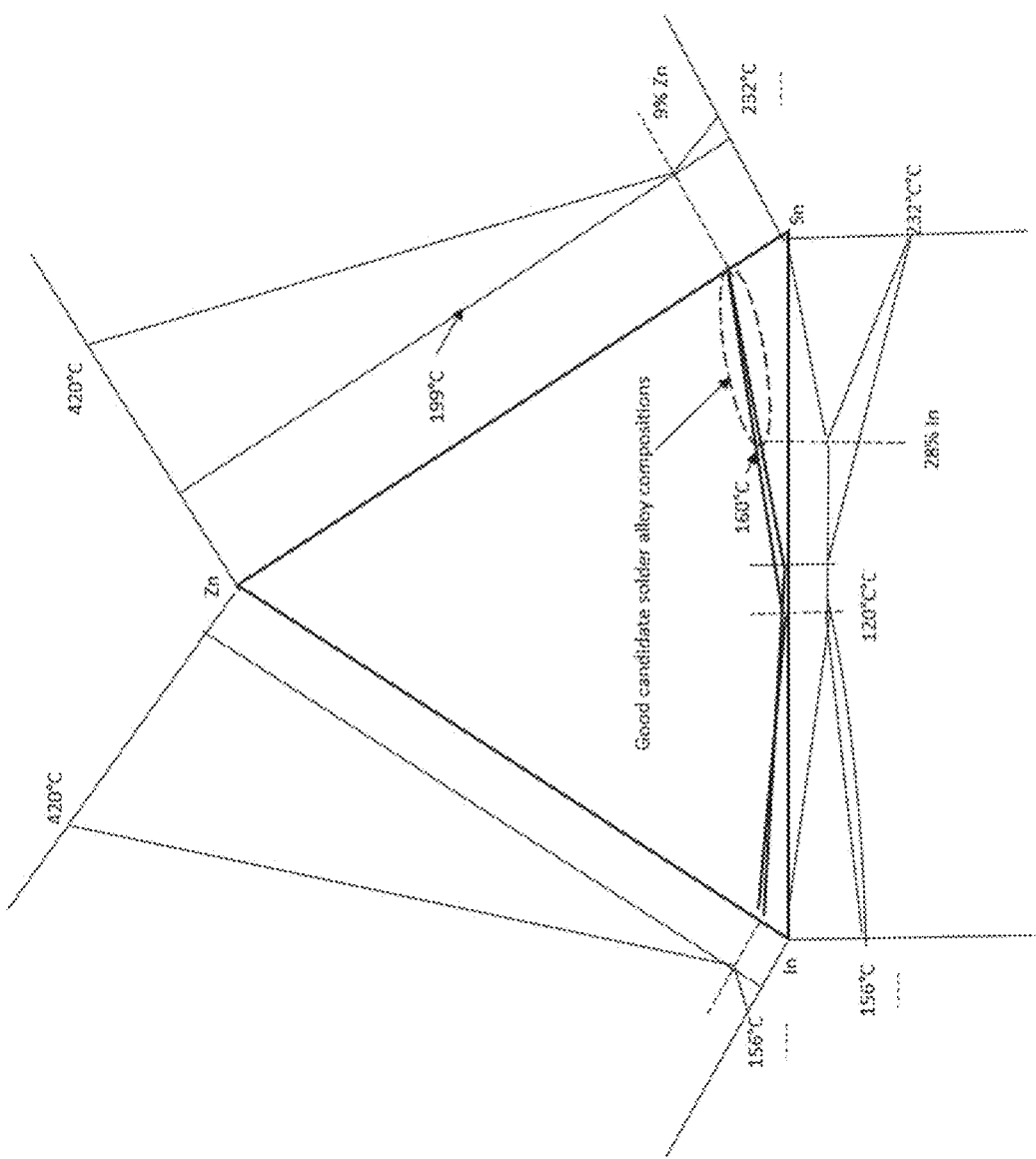
FIG. 9 is ternary phase diagram of tin, indium, and zinc showing a eutectic trough according to some embodiments.

Zinc forms eutectic alloys with both tin and indium as shown in FIGS. 7 and 8. Eutectic or near eutectic alloys are good candidates for soldering alloys. Approximate eutectic troughs in tin-indium-zinc ternary systems are shown in FIG. 9. Therefore, ternary tin-indium-zinc alloys with indium less than 28% and zinc about 5% to 20% zinc are determined to be good candidates for evaluation. A small amount of silver (about 1% to 6% by weight) is added to prevent silver migration from the contact pad on the glass to the solder alloy.

In several examples of the electrical connector 10, the second layer 24 has a thickness that is between 8% to 30% of the thickness of the contact portion 20. Electrical connectors 10 having a second layer thickness in a range of about 8% to 15% of the contact portion thickness and a solder layer containing about 24% indium by weight, about 9% zinc by weight, about 3% silver by weight, and about 64% tin by weight were able to pass a range of environmental exposure tests without causing glass cracking. Electrical connectors 10 having a second layer thickness of about 30% of the contact portion thickness and a solder layer containing about 24% indium by weight, about 9% zinc by weight, about 3% silver by weight, and about 64% tin by weight were able to pass a range of environmental exposure tests without causing glass cracking.

While the examples of the electrical connector 10 presented herein are directed to connecting wires to electrical contact pads on glass these are not limiting, and alternative embodiments may be envisioned having other uses and applications.

Accordingly, an electrical connector 10 and a solder alloy 26 is presented. The electrical connector 10 provides the benefit of providing an electrical connector between a wire cable 12 and contact pad 14 on a glass surface 16 while reducing or eliminating the incidence of glass cracking when soldering the connector 10 to the pad 14 while still meeting requirements to withstand exposure to temperatures up to 150° C. without failure of the solder joint. The solder alloy 26 has the additional benefit of lower cost by being a tin-based alloy rather than the more expensive indium-based alloy.

While preferred embodiments been described, this disclosure is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

We claim:

1. An electrical assembly, comprising:
a wire electrical cable soldered to a conductive pad disposed on a glass surface by a solder alloy consisting of:
24% to 28% indium by weight;
5% to 20% zinc by weight;
1% to 6% silver by weight; and
a remaining weight of the solder alloy being tin.

2. The electrical assembly according to claim 1, wherein the solder alloy includes about 9% zinc by weight.

3. The electrical assembly according to claim 1, wherein the solder alloy includes about 12% zinc by weight.

4. The electrical assembly according to claim 1, wherein the solder alloy includes about 3% silver by weight.

5. The electrical assembly according to claim 1, wherein the solder alloy includes about 5% silver by weight.

6. A solder alloy, consisting of:
24% to 28% indium by weight;
5% to 20% zinc by weight;
1% to 6% silver by weight;
1% to 3% copper by weight; and
a remaining weight of the solder alloy being tin.

7. The solder alloy according to claim 6, wherein the solder alloy includes about 9% zinc by weight.

8. The solder alloy according to claim 6, wherein the solder alloy includes about 12% zinc by weight.

9. The solder alloy according to claim 6, wherein the solder alloy includes about 3% silver by weight.

10. The solder alloy according to claim 6, wherein the solder alloy includes about 5% silver by weight.

11. An electrical assembly, comprising:
a wire electrical cable soldered to a conductive pad disposed on a glass surface by a solder alloy consisting of:
17% to 28% indium by weight;
12% to 20% zinc by weight;
1% to 6% silver by weight; and
a remaining weight of the solder alloy being tin.

12. The electrical assembly according to claim 11, wherein the solder alloy includes about 18% indium by weight.

13. The electrical assembly according to claim 11, wherein the solder alloy includes about 22% indium by weight.

14. The electrical assembly according to claim 11, wherein the solder alloy includes about 24% indium by weight.

15. The electrical assembly according to claim 11, wherein the solder alloy includes about 3% silver by weight.

16. The electrical assembly according to claim 11, wherein the solder alloy includes about 5% silver by weight.

17. A solder alloy, consisting of:
17% to 28% indium by weight;
12% to 20% zinc by weight;
1% to 6% silver by weight;
1% to 3% copper by weight; and
a remaining weight of the solder alloy being tin.

18. The solder alloy according to claim 17, wherein the solder alloy includes about 18% indium by weight.

19. The solder alloy according to claim 17, wherein the solder alloy includes about 22% indium by weight.

20. The solder alloy according to claim 17, wherein the solder alloy includes about 24% indium by weight.

21. The solder alloy according to claim 17, wherein the solder alloy includes about 3% silver by weight.

22. The solder alloy according to claim 17, wherein the solder alloy includes about 5% silver by weight.

\* \* \* \* \*